US005639058A

United States Patent [19]

Mammel

[11] Patent Number: 5,639,058

[45] Date of Patent: Jun. 17, 1997

[54] REMOVABLE SHIFT SLIDE STABILIZER

[76] Inventor: John J. Mammel, 2340 N. Limestone St. Apt. 201, Springfield, Ohio 45503

[21] Appl. No.: 490,256

[22] Filed: Jun. 14, 1995

[51] Int. Cl.[6] .......... F16M 13/00

[52] U.S. Cl. .......... 248/544; 248/300; 248/74.2; 248/231.81

[58] Field of Search .......... 248/200, 201, 248/228.8, 300, 74.2, 301, 231.81, 544, 229.16; 84/488

[56] References Cited

U.S. PATENT DOCUMENTS

| | | | |
|---|---|---|---|
| 1,206,645 | 11/1916 | Altman | 248/200 |
| 1,218,283 | 3/1917 | Morte | 248/228.8 |
| 2,354,404 | 7/1944 | Sayles | 248/300 |
| 2,437,535 | 3/1948 | Jenkins | 248/301 |
| 2,911,690 | 11/1959 | Sanford | 248/300 |
| 3,178,138 | 4/1965 | Hessdoerfer | 248/300 |
| 3,357,662 | 12/1967 | Peterson | 248/229.16 |
| 3,565,382 | 2/1971 | Passarelli | 248/300 |
| 4,951,524 | 8/1990 | Niskanen | 248/74.2 |

*Primary Examiner*—Karen J. Chotkowski
*Assistant Examiner*—Gwendolyn A. Wrenn
*Attorney, Agent, or Firm*—Robert L. McKellar

[57] ABSTRACT

What is disclosed herein is a removable shift slide stabilizer tool used in the repair and maintenance of inboard-outboard engines used on watercraft.

1 Claim, 2 Drawing Sheets

REMOVABLE SHIFT SLIDE STABILIZER

The invention disclosed and claimed herein deals with a removable shift slide stabilizer tool used in the repair and maintenance of inboard-outboard engines used on watercraft.

BACKGROUND OF THE INVENTION

The engine, which serves as the power plant for the watercraft, is mounted on the inside, and in the transom of the watercraft and consists of three major assemblies, namely, the engine, the transom assembly, and the drive unit.

These engines are conventional automotive style four cycle gasoline engines, and are mounted on the inside of the watercraft. The transom assembly is bolted to the transom of the watercraft and this allows the hooking together of the engine to the hull of the watercraft. It also serves as the connecting link between the engine and the drive unit. The back of the engine is mounted to the inner transom assembly and the drive unit is mounted to the outer transom assembly. The drive unit is a relatively heavy streamlined gearcase which transfers the power of the engine down below the surface of the water to the propeller. This is also where the engine is shifted from forward to reverse.

The applicant herein is not aware of any prior art devices used for this purpose and a literature search has not shown any such devices.

THE INVENTION

The invention herein deals with a removable shift slide stabilizer tool for use in the repair and maintenance of watercraft engines.

Thus, the invention is a removable shift slide stabilizer comprising a tool of unitary construction which has a body with an upper end, a lower end, a front surface, and a back surface. The lower end of the body is configured in a C-shape having an open side, with the C-shape being vertically aligned with the body and, the open part of the C-shape being forward of the front surface of the body.

The upper end of the body is surmounted by a 90° angled shoulder having a floor with a back edge, a bottom surface having a top surface, a near right corner, and, has surmounted on the top surface and near the back edge, parallel to the back edge, a wall, which is perpendicular to the top surface of the floor and has essentially the same overall dimensions as the floor. The floor is integrally attached to the upper end of the body, at the bottom surface of the floor, at the near right corner.

The back surface of the body has integrally mounted on it, at essentially a mid-point between the shoulder and the C-shape, a protrusion for handling the tool.

DETAILED DESCRIPTION OF THE INVENTION

As noted above, power plants are made up of three major assemblies, namely, the engine, the transom assembly, and the drive unit.

The power of the engine is transmitted to the drive unit via a splined shaft 19 (shown in FIG. 3) that has two automotive style U-joints built into it. This is called the U-joint shaft. The U-joint shaft extends from the drive unit, through the transom assembly, and into a splined coupler which is bolted to the crankshaft of the engine.

Because shifting the engine from forward to reverse is accomplished inside the drive unit, a shift cable is required to extend from the shifter control handle in the watercraft, through the transom assembly, and into the drive unit.

The end of the shift cable which goes into the drive unit is connected to a long lever called a shift slide.

When the drive unit is being installed, the shift slide lever must be in a straight alignment in a vertical position in order to be insertable into its corresponding slot in the drive unit.

There is a problem with maintaining this lever in a straight vertical position until the drive unit is sufficiently placed on the transom assembly to hold the lever in such a position.

The shift slide is not mounted solidly to the shift cable. It has a floating connection and is free to rotate around the end of the shift cable. When the drive unit is ready to be installed, the mechanic lines up the shift slide and puts it in a vertical position. The weight of the drive unit requires the mechanic to hold it with both hands while maneuvering it into place. The slightest bump or jar usually caused while starting the U-joint shaft into place, knocks the shift slide out of vertical alignment. This forces the mechanic to either try to hold the drive unit with one hand, while re-positioning the shift slide, or completely removing the half-installed drive unit, setting it aside, realigning the shift slide, and essentially starting over.

The shift slide stabilizer tool of this invention is designed to hold the shift slide in perfect vertical position while the mechanic installs the drive unit. Because the mechanic does not have to worry about bumping or jarring the shift slide out of alignment, he can work much more rapidly on installing the drive unit.

The mechanic installs the device of this invention, moves the drive unit onto the transom assembly until the drive unit is within approximately 1 to 2 inches of being completely in place thus holding the shift slide in alignment, and then the shift slide stabilizer tool is no longer needed and is removed, and the mechanic can then move the drive unit into its required position.

Figure 1:
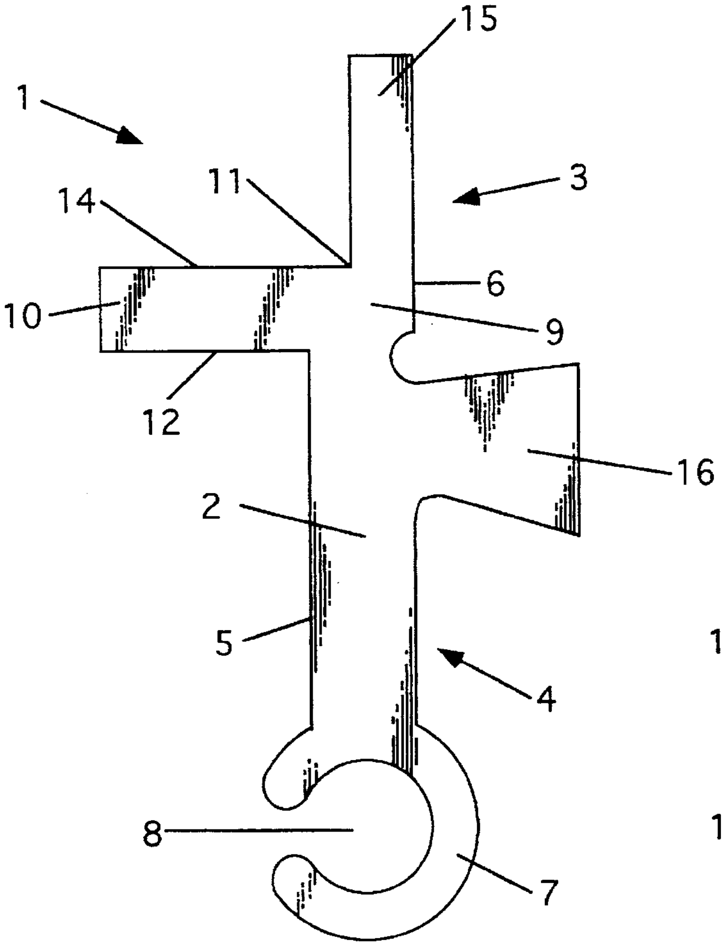
FIG. 1 is an enlarged full side view of the device of this invention.

Now turning to a description of the invention and with regard to FIG. 1, there is shown a full side view of a device 1 of this invention having dimensions which are about triple the size of the actual device.

As can be noted, the device is of a unitary construction and can be manufactured from any convenient material such as wood, plastic, metal and the like.

The device 1 has a body 2 which has an upper end 3 which for purposes of illustration is approximately the upper one-half of the device 1. The body 2 has a lower end 4 which for purposes of illustration is approximately the lower one-half of the device 1.

Figure 2:
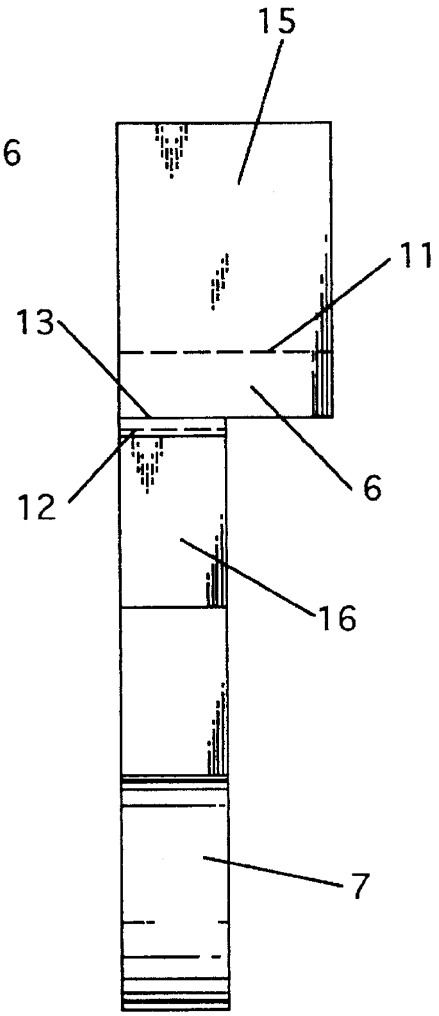
FIG. 2 is an enlarged full back view of the device of this invention.

The device 1 has a front surface 5 and a back surface 6, (shown more clearly in FIG. 2). The lower end 4 of the body 2 is configured in a C-shape 7 with an open side 8 facing forward of the device 1. The C-shape 7 is vertically aligned with the body 2 and the open side 8 of the C-shape 7 is forward of the front surface 5 of the body 2. This C-shape configuration is required in order to stabilize the device 1 while it is in use. The C-shape configuration allows one to conveniently mount the device 1 on the transom assembly 20 by slipping the C-shape over a stud 18 that is already in place and is used eventually to mount the drive shaft to the transom assembly 20.

The upper end 3 of the body 2 has integrally surmounted thereon, a ninety degree angled shoulder 9 which has a floor 10 with a back edge 11. The floor 10 is the part of the device 1 which actually supports the shift slide in place, while the wall 15, described infra, holds the shift slide in a vertical position. The floor 10 has a bottom surface 12 and a near right corner 13 shown in phantom in FIG. 2. The floor 10 also has a top surface 14.

The floor 10 has a wall 15 which is integrally mounted on the top surface 14 and parallel to and near the back edge 11 of the floor 10. The wall 15 is perpendicular to the plane formed by the top surface 14 of the floor 10. The wall 15 has essentially the same overall dimensions as the floor 10. The wall 15 and the floor 10 thus form the 90° angled shoulder 9. The 90° angled shoulder 9 is integrally mounted on the top of the body 2 at the near right corner 13, it being understood that the term "near right corner" is being used herein to help illustrate the invention and that there is in actuality, no near right corner owing to the integration of the segments of the device.

Finally, there is integrally mounted on the back surface 6, at essentially a mid-point between the angled shoulder 9 and the C-shaped 7, a protrusion 16 which is in a sense a handle for the device 1 so that it can readily be placed and removed from the transom assembly 20.

Figure 3:
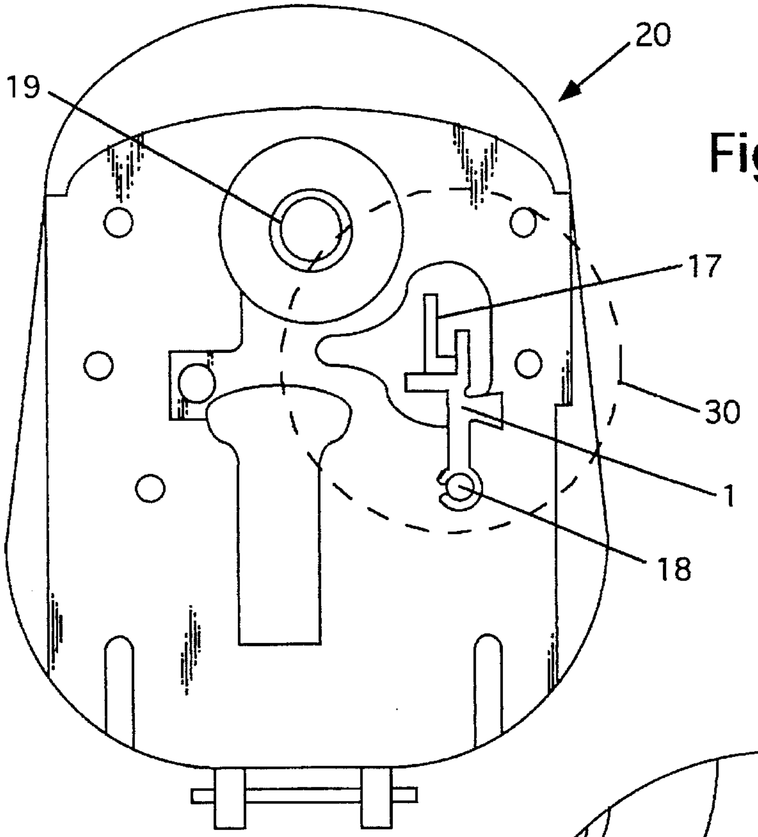
FIG. 3 is a full front view of a partial transom assembly of a power plant for watercraft.

FIG. 3 is a full front view of a transom assembly 20 that is described supra.

This Figure shows a device 1 of this invention in place holding a shift slide 17 in position.

It should be noted that the device 1 is held in place by positioning it on a stud 18, which stud 18 is in place to be used to mount the power drive (not shown) into place on the transom assembly 20. It should be further noted that the device 1 is simply slipped over the bolt 18 which means that upon the need to remove the device 1, it is simply slipped off from the stud 18. There is no need to hold the device 1 in place using a nut or some other similar fastener.

Figure 4:
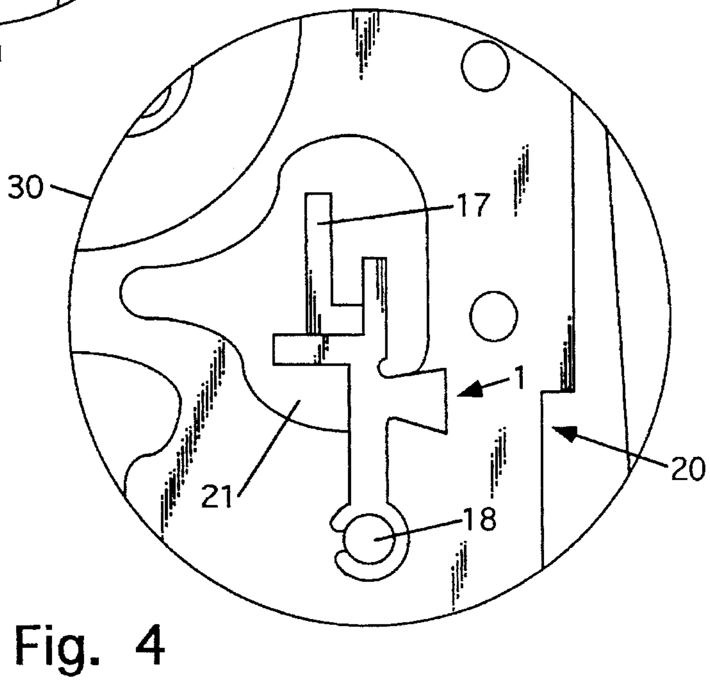
FIG. 4 is an enlarged section of FIG. 3, showing the device of this invention in place on the transom assembly and supporting a shift slide.

FIG. 4 is an enlargement of the area 30 of FIG. 3, showing more detail of the device 1 of this invention in place on the transom assembly 20.

Thus, there is shown the device 1, the shift slide 17 the opening 21 for the entry of the shift slide 17 into the transom assembly 20, and the stud 18.

The device of this invention has many and varied benefits. Removing the drive unit for service and inspection is the number one service procedure for inboard/outboard power plants in terms of frequency.

The drive units must be removed whenever the U-joints are being inspected, greased, or replaced, the engine coupler is being inspected, greased, or replaced, gimbal bearings or bellows boot are being inspected or replaced, the shift cable needs servicing, the drive unit needs servicing, for seasonal preventative maintenance, or complete engine removal.

This device greatly decreases the difficulty of installing the drive unit, especially when it is noted that one such drive unit weighs about 76 pounds.

The placement of the drive unit on the low watercraft transom results in the mechanic having to bend over to do the work and at the same time support this heavy load, and at the same time being careful not jar or bump the shift slide loose. This device relieves this difficulty and provides a means to prevent back injuries to the mechanic.

What I claim is:

1. A removable shift slide stabilizer comprising a tool of unitary construction and having a body with an upper end, a lower end, a front surface, and a back surface wherein the lower end of the body is configured in a C-shape having an open side, with the C-shape being vertically aligned with the body and, the open part of the C-shape being essentially forward of the front surface of the body;

the upper end of the body being surmounted by a 90° angled shoulder having a floor with a back edge, a bottom surface, a top surface, a near right corner, and, having surmounted on the top surface and near the back edge, parallel to the back edge, a wall, which wall is perpendicular to a plane formed by the top surface of the floor and has essentially the same overall dimensions as the floor, and said floor being integrally attached to the upper end of the body, at the bottom surface of the floor, at the near right corner;

the back surface of the body having integrally mounted thereon, at essentially a mid-point between the shoulder and the C-shape, a protrusion.

* * * * *